Nov. 24, 1936.  R. C. HOBSON  2,061,767
CAR TRUCK
Filed Aug. 12, 1932   8 Sheets-Sheet 1

INVENTOR
Roy C. Hobson
BY
Clarence S Kerr
HIS ATTORNEY

Nov. 24, 1936.  R. C. HOBSON  2,061,767
CAR TRUCK
Filed Aug. 12, 1932  8 Sheets-Sheet 4

INVENTOR
Roy C. Hobson
BY
Clarence D. Kerr
HIS ATTORNEY

Nov. 24, 1936.                R. C. HOBSON                2,061,767
                                CAR TRUCK
                          Filed Aug. 12, 1932         8 Sheets-Sheet 5

INVENTOR
Roy C. Hobson
BY
Clarence S Kerr
HIS ATTORNEY

Nov. 24, 1936.  R. C. HOBSON  2,061,767
CAR TRUCK
Filed Aug. 12, 1932  8 Sheets-Sheet 7

INVENTOR
Roy C. Hobson
BY
Clarence B Kerr
HIS ATTORNEY

Nov. 24, 1936.  R. C. HOBSON  2,061,767
CAR TRUCK
Filed Aug. 12, 1932   8 Sheets-Sheet 8

INVENTOR
Roy C. Hobson
BY
Clarence Kerr
HIS ATTORNEY

Patented Nov. 24, 1936

2,061,767

UNITED STATES PATENT OFFICE 2,061,767

CAR TRUCK

Roy C. Hobson, Willoughby Township, Lake County, Ohio, assignor to National Malleable and Steel Castings Company, Cleveland, Ohio, a corporation of Ohio Application August 12, 1932, Serial No. 628,460

26 Claims. (Cl. 105—197)

This invention relates to railway car trucks and has for an object the provision of novel means for supporting the bolster and for cushioning movements of the bolster with respect to the side frame. I have discovered that rubber may be advantageously utilized for this purpose and that rubber may be incorporated in car trucks in sufficient volume to obtain substantially the same resistance and deflection characteristics as are attained by the bolster supporting springs at present employed. An outstanding feature of my invention resides in the utilization of rubber as a bolster supporting and cushioning means and in novel provisions enabling rubber to be effectively employed to this end in car trucks. Other features of the invention will be hereinafter described and claimed.

Figure 1:
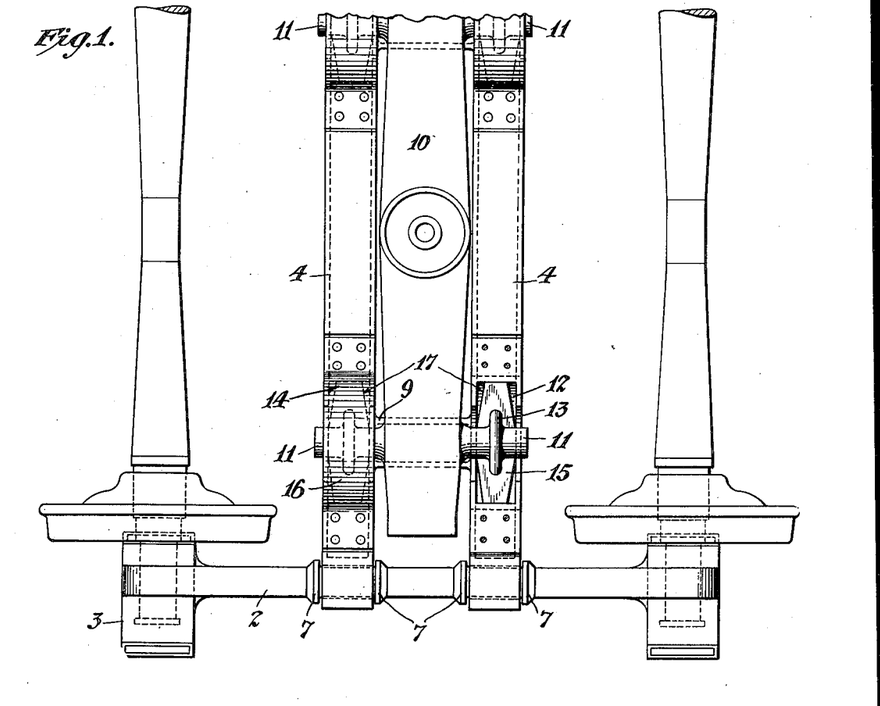
Figure 1 is a plan view showing a portion of a street railway car truck embodying my invention, a portion of one of the transoms being removed to show the interior thereof.
Figure 3:
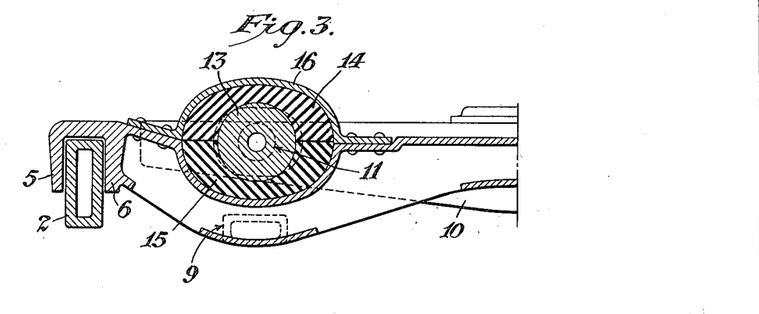
Figure 3 is a fragmentary vertical sectional view on line 3—3 of Figure 2.
Figure 4:
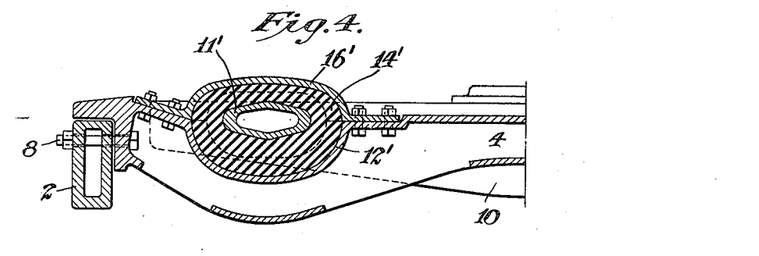
Figure 4 is a fragmentary vertical sectional view showing a modified form of the invention.
Figure 5:
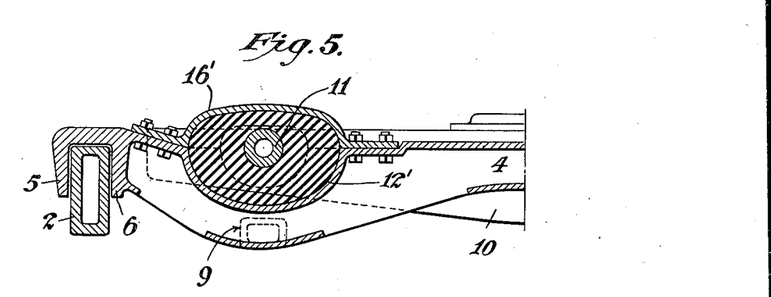
Figure 5 is a fragmentary vertical sectional view showing another modification.

Referring to Figure 1, the car truck there shown comprises a pair of side frames, one of which is shown at 2. The side frame is shown with integral journal boxes 3 and may be of box section, as shown in Figures 3, 4 and 5. Transoms 4, 4 connect the side frame 2 with the opposite side frame (not shown) of the truck. Each of said transoms may be provided at each end thereof with a portion comprising depending jaws 5, 6 (Figure 3) for receiving the side frame therebetween. The side frames may be provided with projections 7 arranged on opposite sides of each transom, as shown in Figure 1. Clearance may be provided between the jaws 5, 6, and the side frame, and also between the transoms and projections 7, to obtain the desired amount of flexibility in the truck. If, however, a more rigid truck is desired, the inner surfaces of the jaws 5 and 6 may be tapered, and the cooperating portions of the side frames similarly tapered to form a wedging fit between the transoms and side frame. As a further alternative, the outer jaw portions 5 of the transoms may be omitted and the transoms bolted to the side frames, as indicated at 8 in Figure 4. The transoms may be rigidly joined together by a reinforcing member 9. The bolster 10 is provided with trunnions 11 extending from opposite sides thereof. Two pairs of such trunnions are shown adjacent the respective ends of the bolster. The trunnions 11 are received in recesses 12 in the transoms. Extending circumferentially around the trunnions, and formed integral therewith, are flanges 13. Within each recess 12 there are mounted rubber inserts 14 and 15 (Figure 3), positioned above and below the associated trunnion and surrounding the same. Each transom 4 is provided with caps 16, one for each of the recesses 12, each cap covering upper insert 14 in the associated recess and being bolted or riveted to the transom to securely hold the inserts 14, 15 in place. Preferably the rubber is placed under initial compression which may be accomplished as the cap 16 is drawn up to the transom by the bolts or other securing means.

It will be apparent from the foregoing description that the car body, which is supported on the bolster, will be resiliently connected to the transoms by means of the rubber inserts. The inserts 15 serve to support the bolster resiliently on the transoms. Thrusts imparted to the bolster laterally of the side frames are taken up by the rubber on either side of the trunnions, while thrusts longitudinally of the side frames, imparted by acceleration or braking movements, will be taken up by the flanges 13 which cooperate with adjacent portions of the rubber. It will be understood that the rubber inserts or blocks 14 and 15 may be originally formed with pockets to receive the flanges 13. The blocks or inserts 14, 15 are relieved at the sides thereof, as indicated at 17 (Figure 1), as a result of which, as the load is applied, the rubber beneath the bolster trunnions will be squeezed into the portion of the transom pocket which normally is not filled with rubber, and, similarly, the rubber may be forced outwardly into the normally unoccupied portions of the pocket in response to lateral and longitudinal thrusts imparted to the bolster.

Figure 2:
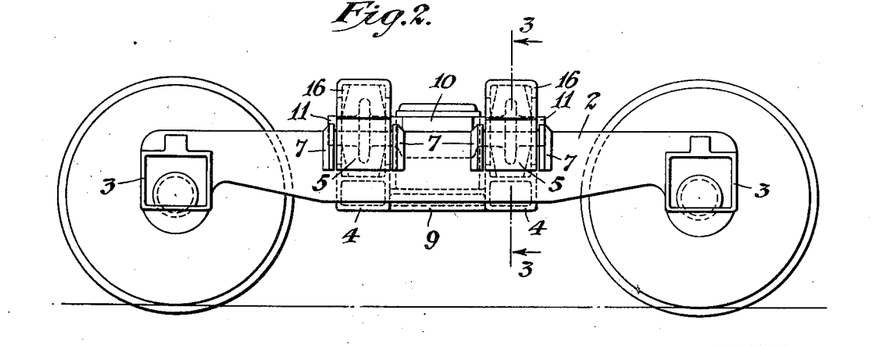
Figure 2 is a side elevation of the truck shown in Figure 1.

In Figure 4 there is shown a modified form of trunnion designated 11', said trunnion being of greater width than height, and providing increased bearing surface resulting in greater resistance to downward movement of the bolster. The increased width of the trunnion further decreases the unit vertical pressure of the bolster on the rubber inserts. The pocket 12' and cooperating cap 16' of the transom may be similarly of greater extent longitudinally of the transom than vertically thereof, as shown in Fig. 4; and at the same time said pocket may be of greater vertical extent below the trunnion than is the extent of the cap above the same, so that a greater quantity of rubber may be positioned below the trunnion than thereabove. The trunnion 11' is shown as unprovided with a flange corresponding to flange 13, wherefore the rubber insert in Fig. 4 may conveniently be formed as a single block 14' having a centrally located opening for fitting over the trunnion 11'. Said block 14' may be slipped over said trunnion, and the latter then mounted in the pocket 12' and the cap 16' applied. If desired, the trunnion 11' could be provided with a projection similar to projection 13 and the rubber insert be formed in sections as in Fig. 3. In the modification shown in Figure 5, the trunnion 11 is of the same shape as shown in Figures 1–3, but the flange 13 has been omitted. The pocket 12' and cap 16', however, are shaped as in Figure 4, providing for greater volume of rubber below the trunnion than above.

Figure 6:
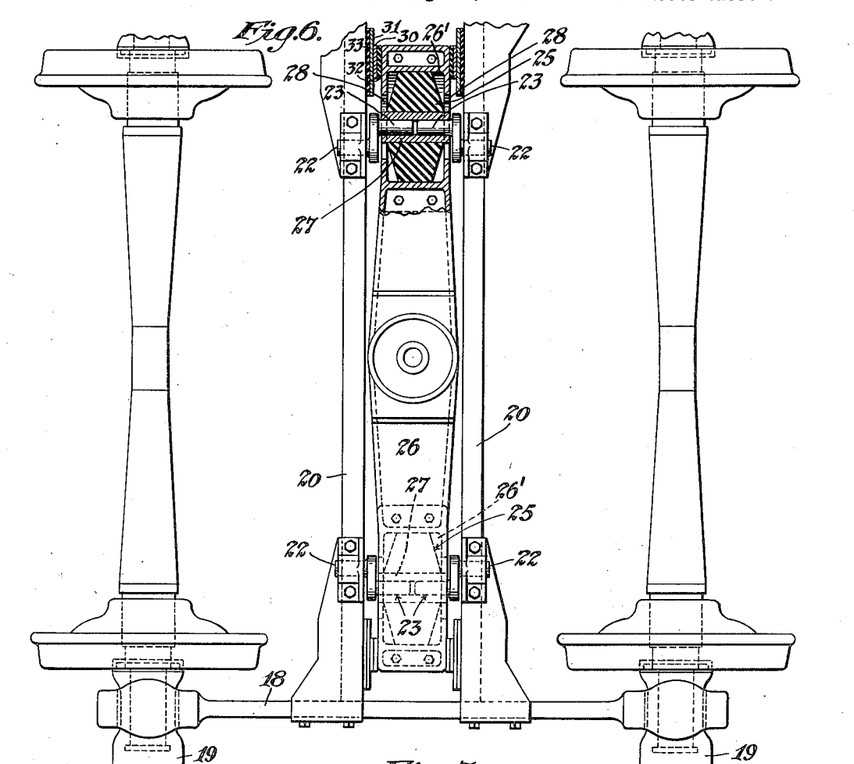
Figure 6 is a plan view of another form of street car truck, an end portion of the bolster and adjacent parts being shown in horizontal section taken on line 6—6 of Figure 8.
Figure 7:
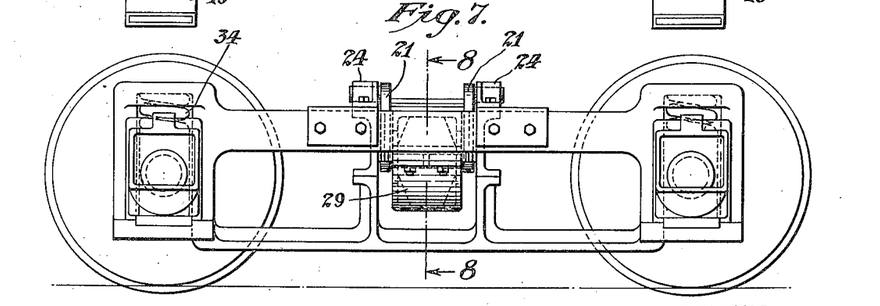
Figure 7 is a side elevational view of the truck shown in Figure 6.
Figure 8:
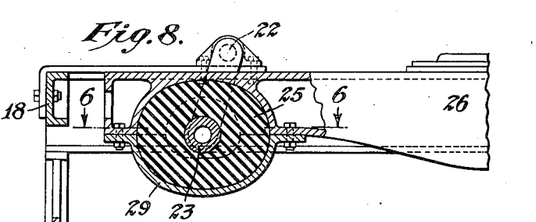
Figure 8 is a fragmentary view, partly in side elevation and partly in vertical section on line 8—8 of Figure 7.

In Figures 6, 7, and 8, the invention is shown applied to a street car truck of conventional type, the side frames 18, journal boxes 19, and transoms 20 of the truck being retained unchanged. In this type of truck, as heretofore employed, the bolster has been supported on leaf springs, which in turn rest on a spring plank hung from the transoms by means of hangers similar to hangers 21. I have eliminated the spring plank and leaf springs. In applying my invention to this form of truck I provide not only trunnions 22, at the upper ends of the hangers, but also trunnions 23 at the lower ends thereof. The trunnions 22 are mounted in sockets of bearing members 24 on the tops of the transoms. The lower trunnions 23 of one pair of hangers extend into a rubber block 25 in a pocket 26' at one end of the bolster 26, while the trunnions 23 of the other pair of hangers extend similarly into a similar rubber block 25 in a pocket 26' in the opposite end of the bolster.

Each of the rubber blocks may have a sleeve 27 extending therethrough to form a bearing for the associated trunnions. It will be seen that in this embodiment of the invention the rubber above the trunnions 23 is compressed. Consequently, the openings 28 in the side walls of the bolster are so positioned as to extend further above the trunnions 23 than below. The trunnions 23 of each pair of hangers are located nearer the adjacent side frame than are the upper trunnions 22. The weight of the car body tends to hold the bolster in a given horizontal plane. When, however, the car body moves laterally, the lateral thrust upon the bolster causes one of the pairs of hangers (depending upon the direction of lateral thrust) to swing in an upward arc, with consequent further compression of the rubber above the trunnions 23 of said hangers. Thrusts upon the bolster in a direction laterally of the side frame are thus resisted and cushioned by the rubber inserts 25. Not only does the rubber above the trunnions 23 aforesaid resist and cushion lateral thrusts, but such thrusts are also cushioned and resisted by the rubber at the sides of said trunnions. Thus, assuming a thrust to the left in Fig. 8, it will be seen that the rubber to the right of the trunnion 23 will be compressed. Lateral thrusts of the bolster with respect to the side frames are limited by the walls of the openings 28 in cooperation with the trunnions 23, whereby damage to the rubber inserts 25 in the event of extreme lateral thrusts is prevented.

The bolster pockets 26' which receive the blocks 25 may be conveniently closed by means of caps 29 bolted or otherwise secured to the bolster as shown in Figures 7 and 8.

In the form of the invention shown in Figures 6, 7, and 8, there are provided plates 30 secured to opposite ends of the bolster on either side thereof and cooperating with plates 31 secured to the adjacent portions of the transoms 20. Pads of rubber 32, 33 are vulcanized to the backs of the plates 30, 31 respectively. The plates 30, 31 and associated pads may be secured in any suitable way as by bolting or riveting to the bolster and transoms respectively. Through said plates and rubber pads effective provision is made for absorbing braking and acceleration thrusts imparted to the bolster. It will be seen that through said plates and pads metal to metal contact between the truck and bolster has been eliminated, whereby vibration and noise between the truck and car body are effectively reduced. Coil springs 34 are shown interposed between the side frames and journal boxes, but if desired these may be omitted and the journal boxes made integral, as in Figure 1.

If desired, the blocks of rubber 25, shown in the bolster of Figure 6, may be placed in the bolster of Figure 1 and the trunnions on the latter made separate so as to pass not only through the rubber blocks or inserts in the transoms 4, but also through said rubber blocks in the bolster. Such an arrangement would provide increased deflection of the bolster. Alternatively, if desired, the trunnions 22 of the hangers in Figure 6 could be mounted in rubber blocks or inserts within bearing members on the transoms 20, so that the bolster would be supported both through such blocks or inserts and the blocks 25.

Figure 9:
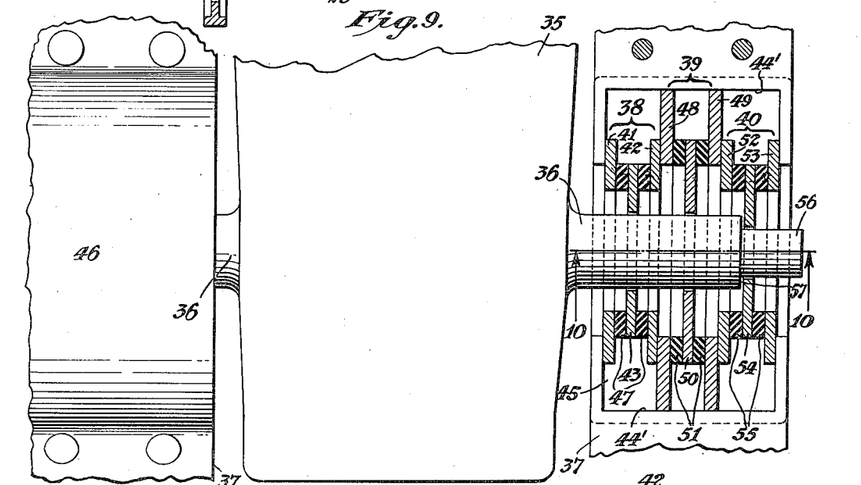
Figure 9 is a view partly in plan and partly in horizontal section, showing another form of rubber supporting and cushioning means for the bolster, wherein the rubber is mounted in such manner as to be subject to shearing stresses upon movement of the bolster with respect to the side frames.
Figure 10:
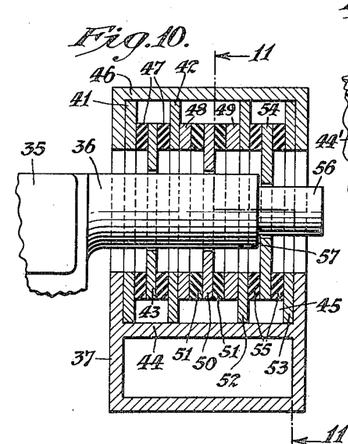
Figure 10 is a vertical sectional view on line 10—10 of Figure 9.
Figure 11:
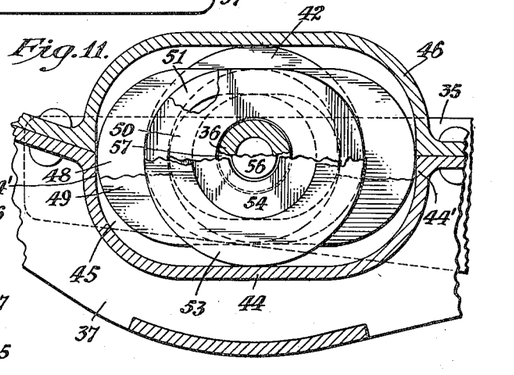
Figure 11 is a vertical sectional view on line 11—11 of Figure 10.

In the form of invention shown in Figures 9, 10, and 11, the bolster 35 is provided at each end with trunnions 36 extending from opposite sides thereof and projecting into the transom members 37, which extend between opposite side frames of the truck. Each trunnion 36 cooperates with a series of groups 38, 39, and 40 of plates in the adjacent transom. The group 38 is formed of plates 41, 42, and 43, the plates 41 and 42 resting at one end against the bottom wall 44 of the pocket 45 in the transom 37 and at the opposite end bearing against the top wall of the cap 46, secured to said transom. The plate 43 is positioned intermediate the plates 41 and 42. Rubber disks 47 are vulcanized to opposite sides of plate 43 and to the adjacent faces of the plates 41, 42, as shown. It will thus be apparent that vertical movements of the bolster will cause the trunnion 36 to move the plate 43 with respect to plates 41, 42, thus stretching the rubber disks 47 and subjecting the same to a shearing stress, whereby said vertical movements are resisted and cushioned. Lateral movement of the bolster with respect to the side frames will cause the unit 38 to move freely with the bolster, said unit moving the plates 41 and 42 along the bottom wall 44 of the pocket 45. The unit 39 comprises plates 48 and 49, together with an intermediate plate 50. Rubber pads 51 are vulcanized to opposite sides of said intermediate plate and to the adjacent faces of said plates 48 and 49. The plates 48 and 49 engage the end walls 44' of the pocket 45 and cap 46. Consequently, lateral movement of the bolster will cause the plate 50 to be moved by trunnion 36 with respect to plates 48, 49, subjecting the rubber disks 51 to shearing stress and stretching the same, so that said lateral movement is resisted and cushioned. Vertical movement of the bolster, however, will simply slide the unit 39 between the top and bottom walls of the pocket 45 and cap 46. Unit 40 comprises plates 52, 53, and intermediate plate 54, with rubber disks 55 vulcanized therebetween. This unit is similar to unit 38 except that plate 54 is provided with a smaller central hole than is plate 43, through which hole there extends a reduced portion 56 of the bolster trunnion 36. Vertical movement of the bolster will move the plate 54 relatively to plates 52 and 53, thereby stretching the disks 55 with consequent cushioning of said movement. The units 40 at the same time provide for resisting and cushioning acceleration and braking thrusts. Thus, it will be apparent that movement of the bolster toward the right in Figure 9 will bring the shoulder 57 of the trunnion 36 against the plate 54, thereby compressing the rubber disk interposed between said plate 54 and the plate 53.

By means of the shearing mounting of the rubber disks, as above described in connection with Figures 9, 10, and 11, a large amount of resistance can be obtained with comparatively small amounts of rubber. Also, with this type of mounting the rubber can be worked under much lower unit stress, which is very desirable where the space available for the rubber inserts is limited. It has been found that in the same space it is possible, with the shearing mounting, to obtain unit stress about one-quarter that of a corresponding block of rubber which fills up the space. It will, of course, be understood that the shear type of mounting above described can be utilized in the forms of the invention shown in Figures 1-8 in lieu of the rubber blocks therein disclosed.

As a modification of the embodiment of the invention above described in connection with Figures 9, 10, and 11, a single unit consisting of plates such as the plates 48, 49, and 50 could be provided, the plates corresponding to said plates 48, 49, and 50 engaging not only the end walls but also the upper and lower walls of the chamber formed by the pocket 45 and cap 46, whereby the rubber disks interposed between the intermediate plate and the outer plates would be subjected to shearing action in response not only to vertical, but also to lateral thrusts of the bolster.

Figure 12:
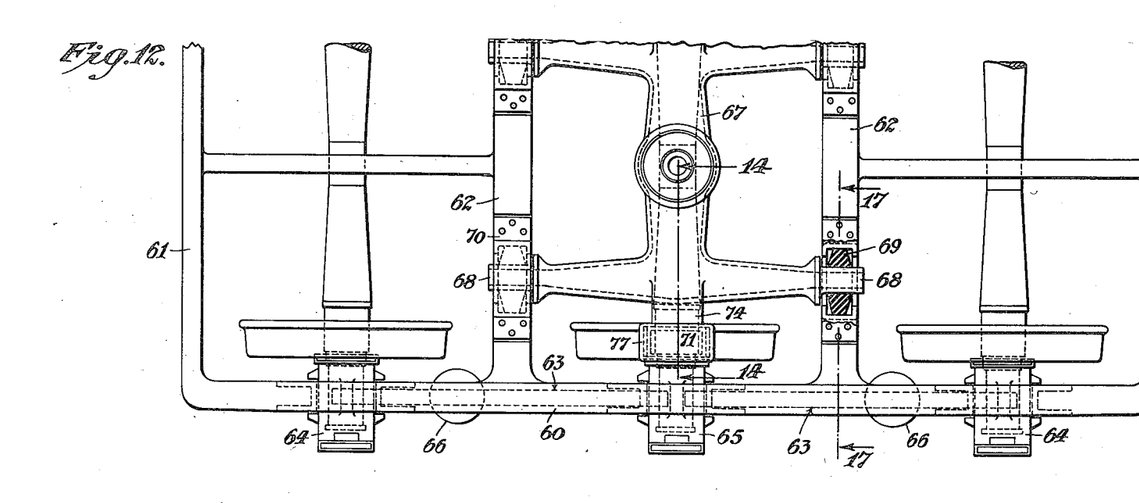
Figure 12 is a plan view showing a portion of a six wheel railway truck embodying my invention.
Figure 13:
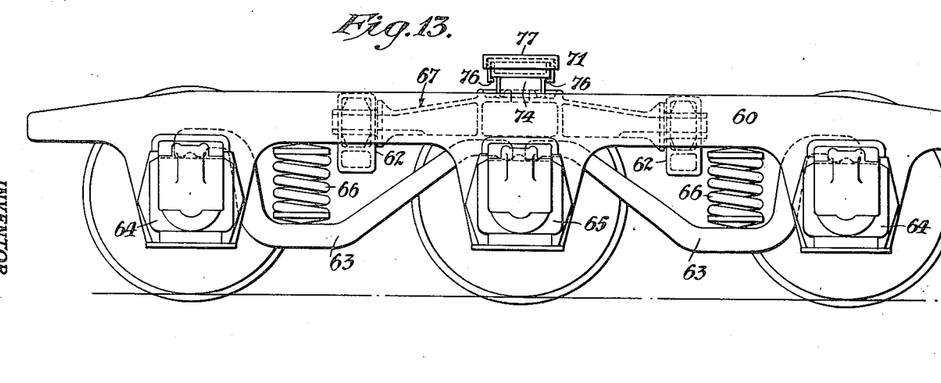
Figure 13 is a side elevational view of the truck shown in Figure 12.

In Figures 12 and 13 there is shown a railway truck of the six-wheel type in which I have incorporated rubber to partially supplant the springs. More particularly, the rubber eliminates the leaf springs which on this type of truck are used to provide for lateral motion. The truck comprises a main frame having longitudinally extending portions one of which is shown at 60, said longitudinally extending portions being joined by integral transverse portions 61, 61, and 62, 62. Cooperating with each portion 60 and with the journal boxes associated therewith is a pair of equalizer members 63, 63; each member of the pair extending from the top of a respective one of the outer journal boxes 64 to the top of the intermediate journal box 65. Springs 66 rest on the equalizers and support the truck frame through engagement with the longitudinal members 60. An H-shaped bolster 67 having trunnions 68 is resiliently connected to the transverse portions 62 of the frame by means of rubber inserts 69. As shown, the inserts 69 are mounted in pockets in the transverse members 62, 62; the trunnions 68 extending through said inserts. The insert receiving pockets may be covered by cap members 70. Through the resilient connection provided by the rubber inserts 69, not only are lateral thrusts of the bolster with respect to the members 60 effectively cushioned, but furthermore vertical movement between the main frame of the truck and the bolster which supports the car body is permitted. Said rubber inserts, together with the coil springs 66, cushion vertical movements of the car; and since the rubber inserts have different resistance travel characteristics than the coil springs, oscillations transmitted through the wheels, as in passing over rail joints, will be broken up before they are transmitted to the car body.

Figure 14:
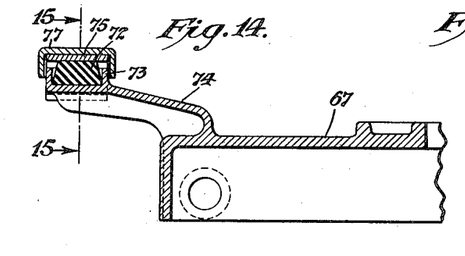
Figure 14 is a vertical sectional view on line 14—14 of Figure 12.
Figure 15:
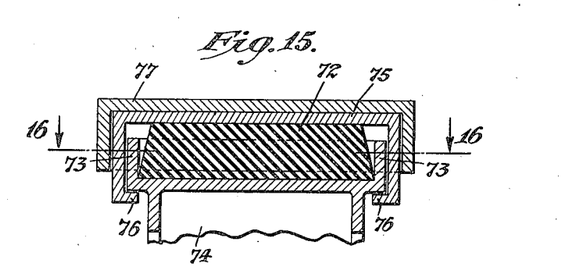
Figure 15 is a vertical sectional view on line 15—15 of Figure 14.
Figure 16:
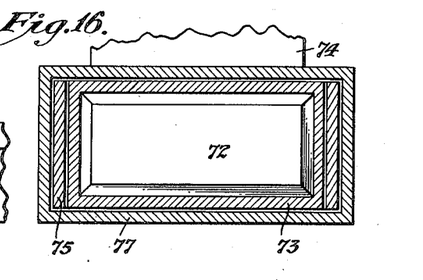
Figure 16 is a horizontal sectional view on line 16—16 of Figure 15.

At 71 there is shown a resilient side bearing which takes up the thrust of the car body imparted to the truck as the body sways or leans on curves or uneven tracks. This side bearing is shown more specifically in Figures 14, 15, and 16. As shown, a rubber block 72 is mounted in a pocket formed of upstanding flanges 73 on an arm 74 integral with and projecting from an end of the bolster 67. A member 75 provided with inwardly projecting bottom flanges 76 is adapted to be slid over the rubber block 72 to hold the latter in place. If desired, the block may be placed under initial compression as the member 75 is slid in place. A cap 77 fits over the member 75 and takes any wear resulting from contact with the car body. This cap, as will be noted, is readily replaceable. The bearing 71 may be shimmed, so as to adjust the clearance between the truck and car body, by merely inserting flat plates between the member 75 and cap 77. It will, of course, be understood that while only one side bearing 71 has been described, a similar side bearing is provided at the opposite end of the bolster in the same manner as has been described with respect to bearing 71.

Figure 17:
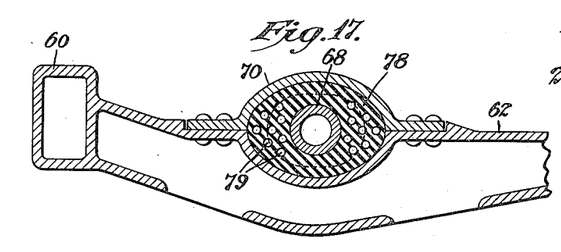
Figure 17 is a fragmentary vertical sectional view showing a further modification.
Figure 18:
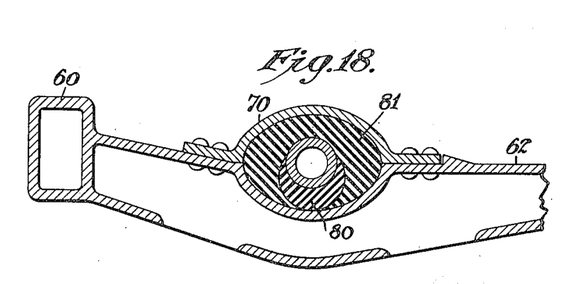
Figure 18 is a view similar to Figure 17 but showing another modification.

Figs. 17 and 18 disclose modifications of the rubber inserts, either of which modifications may be employed in lieu of any of the inserts previously described. In the form shown in Fig. 17 the insert 78 has holes 79 molded therethrough so as to decrease the resistance to lateral movement. As is well known, the lateral thrusts on a car are generally equivalent to approximately one-fourth the weight of the car and consequently the amount of rubber provided to resist these thrusts may be considerably less than that necessary to support the car. The holes 79 also permit increased lateral motion. In Fig. 18 the insert comprises a pair of rubber blocks 80 and 81, which blocks have different resistance characteristics. The block 80, for instance, which block is subject to the weight of the car, may be of considerably stiffer rubber than the block 81.

Figure 19:
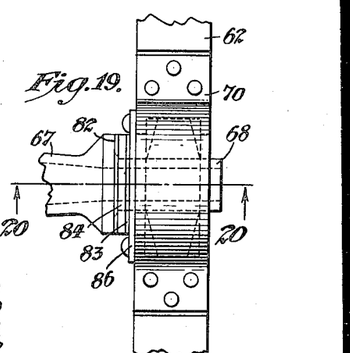
Figure 19 is a fragmentary plan view showing a modified form of means for cushioning thrusts due to acceleration and braking.
Figure 20:
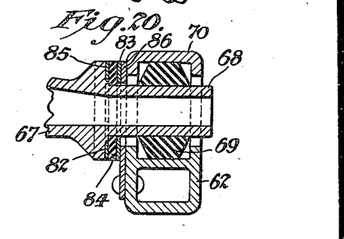
Figure 20 is a vertical sectional view on line 20—20 of Figure 19.
Figure 21:
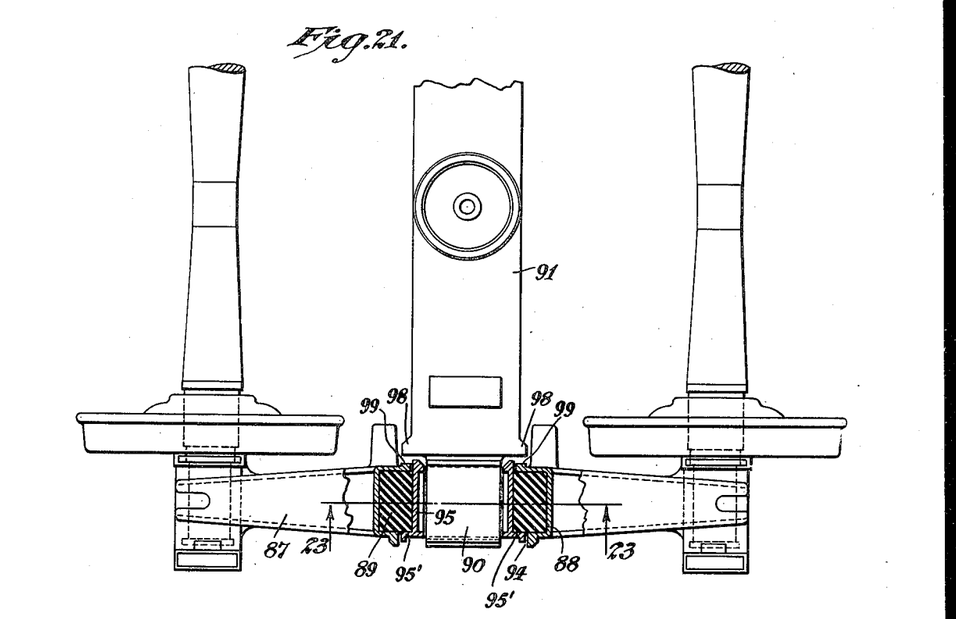
Figure 21 is a plan view showing a portion of another form of car truck in which my invention is incorporated.
Figure 22:
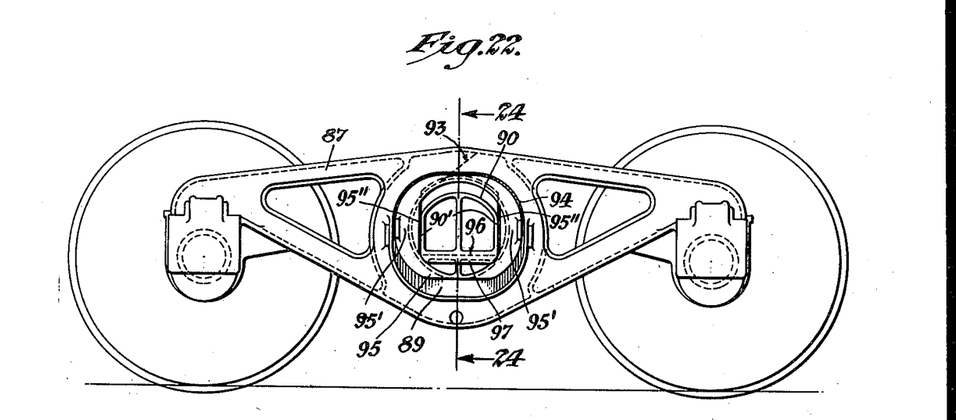
Figure 22 is a side elevational view of the truck shown in Figure 21.

In Figures 19 and 20 there is shown another means which may be employed for cushioning thrusts due to acceleration and braking. Discs 82 and 83 have interposed therebetween a disc of rubber 84. The rubber 84 is vulcanized to the discs 82 and 83. The unit comprising said discs 82, 83, 84 may be slipped over the trunnions 68 of the bolster. It will be apparent that the braking or acceleration thrust will thereby be cushioned by the rubber 84, each of the units aforesaid being positioned between a shoulder 85 adjacent the bolster trunnion and the adjacent transverse frame member 62. A wear plate 86 may be slipped over each trunnion 68 to take up wear caused by vertical or lateral movements between the bolster and the associated frame member 62. It will be apparent that not only may this form of cushioning means be embodied in the truck shown in Figures 12 and 13 but that it may also be employed, for example, in lieu of the flanges 13 in the truck of Figures 1 and 2.

In Figures 21–26 there is shown a further form of railway truck in which my invention is embodied. The side frames, one of which is shown at 87, may be of conventional design except that an enlarged pocket 88 is provided in the central portion thereof. In this pocket there is placed a rubber block or insert 89, into which block an end projection 90 of the bolster 91 extends. In the form shown in Figures 21 to 24 the rubber block 89 is cut away at 92 to provide for lateral motion between the bolster and side frame. These cutaway portions 92 also provide for displacement of the rubber upon vertical movement of the bolster. Said cutaway portions may extend entirely around the block or ring 89 or only partially around the circumference thereof. The block 89 is slit as at 93 and is applied by first deforming it into a small ring at which time it can be inserted into the opening 94 in the outside of the side frame 87. Said block can then be expanded into the form shown in Figure 23. A sleeve 95 is fitted into the inner diameter of the rubber insert 89 as shown, and is tightly gripped by said insert. Said sleeve is provided with a bolster supporting shelf 96. The end projection 90 of the bolster 91 may be slid into the sleeve 95 to rest upon the supporting shelf 96 thereof. Said end projection 90 is provided with depending flanges 97 which engage the opposite sides of portion 96 to hold the bolster in position with respect to the sleeve 95. Lateral movement between the bolster and side frame may be limited by projections 98 on the bolster which are adapted to contact with portions 99 of the side frame.

Figure 23:
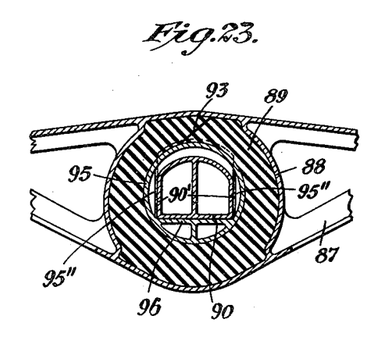
Figure 23 is a longitudinal vertical sectional view on line 23—23 of Figure 21.
Figure 24:
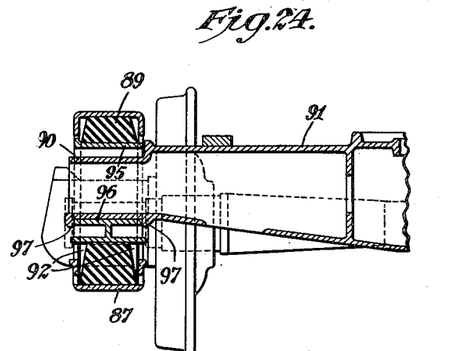
Figure 24 is a transverse vertical sectional view on line 24—24 of Figure 22.

The sleeve 95 has an outer flange portion 95' engaging the face of the block 89 and is further shown provided with vertical portions 95" for cooperation with the corresponding, vertically extending side walls 90' of the bolster projection 90.

Figures 25, 26, 27:
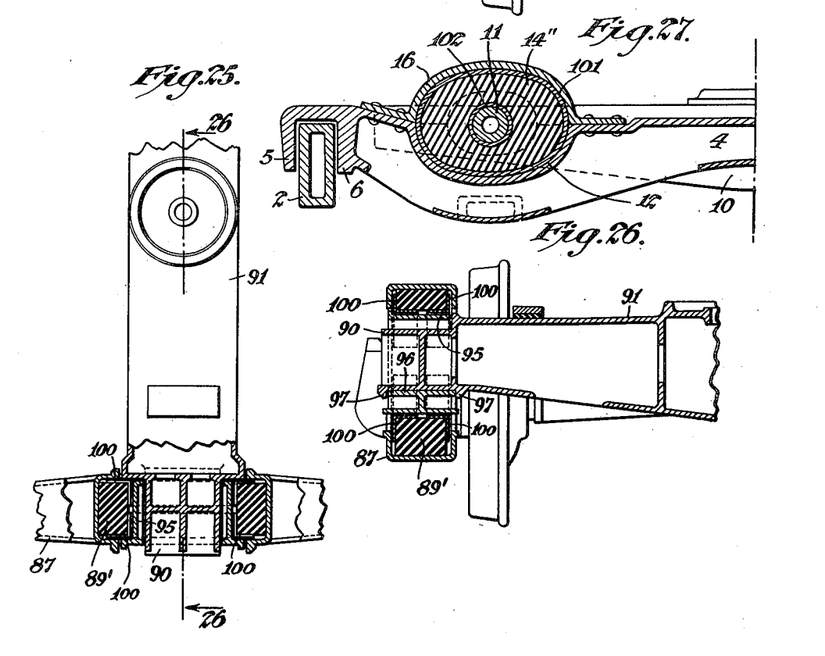
Figure 25 is a view partly in plan and partly in horizontal section showing a modified form of the invention in conjunction with the type of truck shown in Figure 21.
Figure 26 is a vertical section on line 26—26 of Figure 25.
Figure 27 is a fragmentary vertical sectional view illustrating a further modification of the invention.

In the modification shown in Figures 25 and 26 the rubber block 89' is the same as block 89 except that it has no cutaway portions corresponding to portions 92 of block 89. However, as the bolster moves downwardly the rubber of the block 89' on the under side of the bolster is caused to flow upwardly into the recess that would be formed by the downward movement of the bolster. Semi-annular retaining members 100 are provided to confine the rubber block 89' and prevent it from squeezing out of the frame. In this form of the invention it is not intended to provide as much lateral motion as in the form shown in Fig. 24. However, it will be apparent that since the thrusts on the bolster are imparted to the side frame through the rubber block 89' a slight amount of lateral motion will occur.

In the form of my invention illustrated in Fig. 27 the rubber block 14" in the recess 12 of the transom 4 is positioned between sleeves 101 and 102, the former of which conforms to said recess and to the cap 16, and the latter of which sleeves surrounds the bolster trunnion 11. Said block 14" is vulcanized to said sleeves, with the consequence that when the trunnion 11 moves downwardly the rubber above the same will be in tension and the rubber below the same in compression. Similarly, if the trunnion moves from right to left, or vice versa, the rubber on one side thereof will be in tension and that on the other side in compression. The block 14" and attached sleeves may be readily inserted as a unit into the transom pocket or recess 12. It will be understood that this form of my invention may be utilized in any of the arrangements herein disclosed wherein a similar form of rubber insert is shown (as in Figs. 1–8, 12, 13 and 17–20).

It may also be noted that in the various forms of my invention herein disclosed the bolster may rotate about its longitudinal axis since it is resiliently connected to the side frame. This is advantageous when the truck is passing over uneven track and the wheels cooperating with a given side frame may be at different elevations. The weight of the car will hold the bolster in the same relative position but the side frame will twist about the bolster. By the provision of a rubber block between the bolster and side frame, it will be seen that upon such relative movement of the side frame and bolster strain on the center plates of the truck and body bolsters is lessened.

It will be apparent that while I have disclosed herein specific forms of my invention in conjunction with certain trucks, it is possible to interchange the different types of rubber mountings, and to use them in connection with other trucks; the particular types of trucks disclosed being simply illustrative of different ways in which the invention may be carried out. For instance, the invention, instead of being embodied in a six-wheel truck as in Figs. 12 and 13 may be employed in the well-known type of four-wheel truck having only one equalizer on a side.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In a car truck, a side frame, a bolster, said bolster having a projection, means comprising a rubber element cooperating with said projection and subjected to a shearing stress upon a movement of the bolster with respect to the side frame for cushioning said movement, and means comprising another rubber element cooperating with said projection and subjected to a shearing stress upon movement of the bolster with respect to the side frame in another direction for cushioning the last mentioned movement.

2. In a car truck, a side frame, a bolster, means extending longitudinally of the bolster for supporting the latter with respect to said side frame, lateral projections on said bolster, and rubber means surrounding said projections and cooperating with the first mentioned means for cushioning movements of the bolster with respect to the side frame.

3. In a car truck, a side frame, a bolster, a member extending transversely from said side frame, and means comprising a projection extending transversely of the bolster and a rubber block cooperating therewith for supporting said bolster from said member, said projection having a flange thereon cooperating with said block to cushion movement of said bolster longitudinally of said side frame.

4. In a car truck, a side frame, a bolster, a member extending transversely of the side frame, a projection extending transversely of the bolster, and rubber means in said member and surrounding said projection for supporting said bolster.

5. In a car truck, a side frame, a bolster, a member extending transversely of the side frame, a projection extending transversely of the bolster, and rubber means in said member cooperating with said projection for cushioning vertical and lateral movements of said bolster with respect to said side frame.

6. In a car truck, a side frame, a bolster, a member extending transversely of the side frame, a projection extending from said member transversely of the bolster, and rubber means mounted in said bolster and cooperating with said projection for cushioning movements of said bolster with respect to said side frame.

7. In a car truck, a side frame, a bolster, a member extending transversely of the side frame, a projection from said member extending transversely of the bolster, said projection being pivotally supported by said member, and rubber means mounted in said bolster and cooperating with said projection for cushioning movements of the bolster with respect to the side frame.

8. In a car truck, a bolster member, a bolster supporting member, means pivotally mounted on one of said members, and rubber means on the other of said members and cooperating with the first mentioned means for cushioning movements of the bolster member.

9. In a car truck, a bolster member, a bolster supporting member, means pivotally mounted on one of said members, and rubber means on the other of said members and cooperating with the first mentioned means for cushioning movements of the bolster member in directions at right angles to each other.

10. In a car truck, a side frame, a bolster member, a bolster supporting member extending transversely of said side frame, means projecting laterally from one of said members, and rubber means in the other of said members and cooperating with the first mentioned means for cushioning movements of the bolster member in directions at right angles to said side frame.

11. In a car truck, a bolster member, a bolster supporting member, means projecting laterally from the side of one of said members, and rubber means on the other of said members adapted to be placed in shear and cooperating with the first mentioned means for cushioning movements of the bolster member in directions at right angles to each other.

12. In a car truck, a side frame, a bolster, transom members extending from said side frame on opposite sides of said bolster, projections extending transversely from the sides of said bolster, and rubber means in said transoms adapted to be placed in shear and cooperating with said projections for cushioning movements of said bolster.

13. In a car truck, a side frame, a bolster, transom members extending from said side frame on opposite sides of said bolster, projections extending transversely from the sides of said bolster, and rubber means in each of said transoms surrounding the corresponding bolster projection for cushioning movements of said bolster.

14. In a car truck, a side frame, a bolster, transom members extending from said side frame on opposite sides of said bolster, hanger elements pivotally mounted on said transoms and having projections extending into said bolster, and rubber means in said bolster surrounding said projections for cushioning movements of said bolster.

15. In a car truck, a bolster member, a bolster supporting member, a projection extending from one of said members, and means on the other of said members and cooperating with said projection for cushioning movements of the bolster member, said means comprising a pair of rubber elements, a pair of members to which said elements are attached, said last mentioned members being so mounted as to be movable in one direction but confined against movement in another direction, and another member to which said rubber elements are attached and positioned for subjecting said elements to shearing stress upon movement of said bolster in said other direction.

16. In a car truck, a bolster member, a bolster supporting member, a projection extending from one of said members and means on the other of said members and cooperating with said projection for cushioning movements of the bolster member, said means comprising a pair of rubber elements, a pair of members to which said elements are attached, said last mentioned members being so mounted as to be movable in one direction but confined against movement in another direction, and another member to which said rubber elements are attached and positioned for subjecting said elements to shearing stress upon movement of said bolster in said other direction, a second pair of rubber elements, a pair of members to which said second pair of elements are secured and so mounted as to be movable in said other direction but confined against movement in the first mentioned direction, and a member to which said second pair of elements are secured and positioned for subjecting said elements to shearing stress upon movement of said bolster in the first mentioned direction.

17. In a car truck, a bolster member, a bolster supporting member, a projection extending from one of said members, the other of said members having a chamber receiving said projection, means in said chamber cooperating with said projection for cushioning movements of the bolster member, said means comprising a pair of rubber elements, a pair of members to which said elements are attached, said last mentioned members bearing against the top and bottom walls of said chamber but spaced from other walls thereof, and another member to which said elements are connected and positioned for operation by vertical movements of said bolster to subject said elements to shearing stress.

18. In a car truck, a bolster member, a bolster supporting member, a projection extending from one of said members, the other of said members having a chamber receiving said projection, means in said chamber cooperating with said projection for cushioning movements of the bolster member, said means comprising a pair of rubber elements, a pair of members to which said elements are attached, said last mentioned members bearing against the top and bottom walls of said chamber but spaced from other walls thereof, and another member to which said elements are connected and positioned for operation by vertical movements of said bolster to subject said elements to shearing stress, a second pair of rubber elements, a pair of members to which said second pair of elements are secured and bearing against said other walls of said chamber but spaced from the top and bottom thereof, and a member to which said second pair of elements are secured and positioned for actuation to subject said elements to shearing stress upon movement of said bolster in a direction at right angles to the vertical.

19. In a car truck, a bolster member, a bolster supporting member, a projection extending from one of said members, the other of said members having a chamber receiving said projection, and rubber means in said chamber subjected to shearing stress in cooperation with said projection upon movement of the bolster in either of directions at right angles to each other.

20. In a car truck, a bolster member, a bolster supporting member, a projection extending from one of said members, rubber means subjected to shearing stress in operation with said projection upon movement of the bolster in either of directions at right angles to each other, and rubber means cooperating with said projection for cushioning movements of the bolster in a direction at right angles to the first mentioned directions.

21. In a car truck, a bolster member, a bolster supporting member, a projection extending from one of said members, and means on the other of said members and cooperating with said projection for cushioning movements of the bolster member, said means comprising a pair of rubber elements, a pair of members to which said elements are attached, said last mentioned members being so mounted as to be movable in one direction but confined against movement in another direction, and another member to which said rubber elements are attached and positioned for subjecting said elements to shearing stress upon movement of said bolster in said other direction, and other means cooperating with said projection for cushioning movements of the bolster in a direction at right angles to said other direction.

22. In a car truck, a bolster member, a bolster supporting member, a projection extending from one of said members and means on the other of said members and cooperating with said projection for cushioning movements of the bolster member, said means comprising a pair of rubber elements, a pair of members to which said elements are attached, said last mentioned members being so mounted as to be movable in one direction but confined against movement in another direction, and another member to which said rubber elements are attached and positioned for subjecting said elements to shearing stress upon movement of said bolster in said other direction, a second pair of rubber elements, a pair of members to which said second pair of elements are secured and so mounted as to be movable in said other direction but confined against movement in the first mentioned direction, and a member to which said second pair of elements are secured and positioned for subjecting said elements to shearing stress upon movement of said bolster in the first mentioned direction, and other means cooperating with said projection for cushioning movements of said bolster in a direction at right angles to both said other direction and said first mentioned direction.

23. In a car truck, a bolster member, a bolster supporting member, a projection extending laterally from the side of one of said members, the other of said members having a chamber receiving said projection, a rubber element in said chamber, a member to which said element is attached and engaging interior portions of said chamber, and another member to which said element is attached and cooperating with said projection for subjecting said rubber element to shearing stress upon relative movement between said bolster and said bolster supporting member.

24. In a car truck, a bolster member, a bolster supporting member, a projection extending from one of said members, the other of said members having a chamber receiving said projection, a rubber element in said chamber, a member to which said element is attached and engaging interior portions of said chamber, and another member to which said element is attached and cooperating with said projection for subjecting said rubber element to shearing stress upon relative movement between said bolster and said bolster supporting member, and means for cushioning thrusts of the bolster in a direction parallel to said projection.

25. In a car truck, a side frame, a bolster having pairs of arms extending transversely there-from on opposite sides thereof, a bolster supporting member extending transversely of said side frame, and rubber means in said member for cushioning movements of said bolster both in a vertical direction and in a direction at right angles thereto.

26. In a car truck, a bolster, a bolster supporting member, a projection extending from one of said members, rubber means on the other of said members surrounding said projection for cushioning movements of the bolster, said rubber means being constructed and arranged to offer less resistance to movement of the bolster in one direction than in a direction at right angles thereto.

ROY C. HOBSON.

DISCLAIMER 2,061,767.—*Roy C. Hobson*, Willoughby Township, Lake County, Ohio. CAR TRUCK. Patent dated November 24, 1936. Disclaimer filed January 11, 1938, by the assignee, *National Malleable and Steel Castings Company.*

Hereby disclaims from the scope of claim 1 of said patent any car truck except one wherein the "projection" from the bolster consists of a single element through which the shear stresses are imparted to the respective rubber elements; and further disclaims from the scope of claim 11 of said patent any car truck except one wherein the "cushioning" of."movements of the bolster member in directions at right angles to each other" is accomplished primarily by the absorption of energy from said bolster movements by the "rubber means".

[*Official Gazette February 1, 1938.*]